3,466,873
SANITARY LAND FILL METHOD
Mortimer T. Present, 555 W. 73rd St.,
Indianapolis, Ind. 46260
No Drawing. Filed Nov. 30, 1967, Ser. No. 686,848
Int. Cl. E02d *17/00;* E02b *3/00*
U.S. Cl. 61—35                                    4 Claims

ABSTRACT OF THE DISCLOSURE

A sanitary land fill and method of making same comprising filling a land area with successive layers of refuse and covering each layer of refuse with a layer of foamed plastic resin which is applied as a liquid, is expanded in situ and solidifies to a rigid cell structure.

BACKGROUND OF THE INVENTION

Field of the invention.—The field of the invention is generally garbage and refuse disposal, and more particularly, refuse disposal by sanitary land fill.

Description of the prior art.—Refuse disposal by sanitary land fill is quite old and widely known. One of the most common methods of making a sanitary land fill comprises the steps of filling a land area with successive layers of refuse three to four feet deep and covering each such layer with a layer of earth fill, which may range in depth from four inches to about a foot. Before each layer of refuse is covered with earth fill, it may be soaked with water and compacted with heavy rollers. This method, although quite satisfactory from a sanitation point of view, is rather expensive. This is due to the relatively high cost of earth moving equipment needed to excavate, transport and spread the earth fill. Operating and maintenance costs of earth moving equpiment are also comparatively high.

What is needed is a method of sanitary land fill that does not require earth fill. One such method is described in Holland, 2,015,361, wherein in a thick, viscous oil, preferably an asphaltic oil or emulsion, is spread over each layer of refuse. Oil accomplishes the requirement of sealing the upper surface of the refuse layer from the air, and thereby traps any noxious odors that would otherwise emanate from the refuse. However, the oil is very messy, adheres to the tires of dump trucks that haul the refuse to the land fill area, and is tracked onto the highways and streets leading to the land fill area. The oil may also be foul smelling. In addition, the oil is flammable, and if ignited by pranksters or otherwise, will burn to produce heavy noxious black smoke and cause air pollution.

The method of land fill of the present invention provides all of the advantages of the immediately above described method, and additionally, eliminates all of the disadvantages thereof.

SUMMARY OF THE INVENTION

The present invention is a novel method of sanitary land fill comprising the steps of covering successive layers of refuse with foamed polyurethane, polyether, or polyester based plastic resins. These materials are easily handled in liquid form and easily spread over a layer of refuse by means of a gun or nozzle having a mixing chamber. Two liquid chemical components of the desired plastic resin are introduced under pressure into the mixing chamber where they are mixed together and forced out of the nozzle. When the two components are mixed, there is an exothermic chemical reaction which produces a gas and a stable plastic resin. The formation of the gas, which may be Freon or carbon dioxide, occurs generally uniformly throughout the reacting components and results in the foamed or cellular structure of the plastic resin. Although the exothermic reaction begins in the mixing chamber of the nozzle, it takes place mostly after the components have been sprayed on the layer of refuse.

In order to provide greater control over the thickness of the layer of foamed plastic resin spread over the refuse, the nozzle may be provided with a source of atomizing air. Although the atomizing air may contribute slightly to the forming of the plastic resin, the foaming is due primarily to the gas produced in the exothermic reaction; the atomizing air merely acting to break up the stream ejected from the nozzle into a wide angle spray so that the foamed plastic resin may be spread more uniformly.

When the layer of foamed plastic resin solidifies, which requires only a few minutes, it has a rigid cellular structure that is impervious to gas and water. It therefore seals in any noxious odors created by the decomposition of the refuse. In addition, the plastic resins mentioned above are ratproof. In fact, rats are actually repulsed by these materials and will not gnaw through them to get to the refuse.

The foamed plastic resin layer is also an effective insect barrier. Not only does it prevent adult insects from laying eggs in the refuse after it has been spread, it also prevents the escape of any insects from the refuse that should hatch from eggs already laid therein.

The foamed plastic resin layer of the present method does not adhere to the tires of dump trucks hauling refuse to the land fill area, and thereby eliminates the mess attendant the use of asphaltic oil, even on the hottest of summer days.

The advantages of the present method over the conventional method of using earth fill are numerous. For example, it costs less than earth fill, it takes up much less space and thereby makes more of the volume to be filled available for refuse rather than being occupied by earth, it is impervious to rats and insects, eliminates the need for heavy earth moving equipment and can easily be spread by one man.

It is therefore an object of the present invention to provide an improved method for sanitary land fill.

It is a further object of the present invention to provide a method of sanitary land fill wherein successive layers of refuse are covered with layers of foamed plastic resin.

It is another object of the present invention to provide a land fill that makes more of the volume of the land fill avaliable for refuse than conventional methods.

It is still another object of the present invention to provide sanitary land fill having layers of foamed plastic resin that are impervious to rats and insects.

It is yet another object of the present invention to provide a method of making a sanitary land fill that is cleaner and more economical than conventional methods of making sanitary land fills.

Still another object of the present invention is to provide a method for making a sanitary land fill that seals in noxious gasses and odors.

These and other objects and advantages of the present invention will become more apparent as the description proceeds, reference being made to the following detailed description and the appended claims.

DESCRIPTION OF THE PREFERRED EMBODIMENT

Disposal of refuse from large cities has been for some time a very pressing problem, often difficult of solution and inevitably expensive. Open dumping is probably the least expensive method, but has the disadvantages of being a breeding ground for rats and insects and giving off great amounts of noxious odors. Incineration is perhaps the most complete method of refuse disposal, but at the same time is the most expensive, and if not very carefully carried out can contribute significantly to the problem of air pollution.

Although refuse disposal by sanitary land fill has been a known and accepted method for many years, it too, has had its drawbacks. Heavy equipment, costly to purchase and expensive to operate, is required to move the large amounts of earth used in conventional sanitary land fill operations. In winter, earth for fill often becomes frozen and difficult, if not impossible, to excavate and spread over a layer of refuse so that it effectively provides an air seal.

The foam used in the method of the present invention is, on the other hand, readily available at any time of the year, does not require heavy equipment in its use, and may be spread in an effective moisture and gas barrier producing layer in much less time by a single workman.

In the method of the present invention, a layer of foam is sprayed over each layer of refuse rather than covering the layer of refuse with land fill. In addition to the advantages mentioned above, the foam layer need be only an inch or less thick to be effective, as opposed to several inches being required for earth fill to be effective. This permits a greater percentage of the total volume available at the land fill site to be filled with refuse.

The foam used in the method of the present invention may be a polyurethane, polyether or a polyester based foam that is blown by Freon or carbon dioxide, as the case may be. Epoxy, silicone and phenolic foams would also appear to be adaptable to the method of the present invention. The foam may be broadly described as a foamed thermosetting material which can be applied as a liquid, expanded in situ, and which solidifies to a rigid cell structure.

In following the method of the present invention, a layer of refuse is spread over the land fill area. The optimum thickness of the layer of refuse will depend upon the particular content of the refuse, but in general, a layer three to four feet deep is quite satisfactory. The layer of refuse may then be soaked with water or mechanically compacted, or both, and then covered with a thin layer of foam. A layer of foam less than one inch thick is generally sufficient, a layer approximately three-eighths (⅜) inch being recommended. A thickness of less than about one-quarter (¼) of an inch would probably not be satisfactory.

The foam used in the present method, upon being sprayed over a layer of refuse, solidifies to a rigid cell structure that is generally gas impervious and is not soluble in water. Unless mechanically disturbed, the layer of foam will remain intact indefinitely. In addition, there is sufficient resiliency in the foam cell structure that it should be uneffected by heaving of the refuse layer during a freeze and thaw. Therefore, in addition to serving as a temporary odor, rat and insect barrier overnight, or over a weekend, the foam used in the present method may be used to seal off an unused portion of the land fill area for an indefinite length of time.

The apparatus for carrying out the method of the present invention may be vehicle mounted so that it may easily be moved about the land fill area. The apparatus may include a first tank for a first component, a second tank for a second component, a first pump for pumping the first component, a second pump for pumping the second component, a first heater for heating the first component and a second heater for heating the second component. Heating the two components lowers their viscosities and thereby reduces the horsepower required to pump them.

A first hose and a second hose convey the first and second components, respectively, from the pumps to the mixing chamber of a nozzle. Located between the nozzle and the pumps may be a proportioning and pressure control device which may include first and second valves. The control device may be either automatic or manual.

In operation, the first and second pumps pump the first and second components through the first and second heaters, through the valves and into the mixing chamber of the nozzle. In the mixing chamber, the first and second components are thoroughly mixed and immediately upon being mixed begin to exothermically react with each other. However, the reaction is not permitted to continue in the mixing chamber, through an accelerating chamber, and sooner mixed than the mixture is discharged from the mixing chamber, through an accellerating chamber, and out of an orifice of the nozzle. The mixture discharged from the orifice may then be directed wherever desired by a workman. When the mixture strikes the ground or other surface, it has a great tendency to adhere because almost as soon as it is discharged from the orifice it takes on a lathery or foamy form that is generally quite sticky and viscous.

After the mixture strikes a surface and adheres thereto, the chemical reaction continues. The reaction between the first and second components creates the thermosetting material and at the same time liberates a gas, a portion of which is trapped within the newly formed thermosetting material in the form of great numbers of small bubbles, thereby resulting in a foamy form of the material. As the reaction goes to completion, the material solidifies into a comparatively rigid state and maintains substantially the same shape that it had assumed during its sticky foamy state.

While the material is in its sticky foamy state it is directed from a nozzle into a thin layer over a layer of refuse, so that when the reaction is complete there will be a layer of solidified material covering the refuse. As described above, the solidified material is substantially water and gas impervious, acts as an insect barrier, and repels rats. Once spread about on the ground, it will be last indefinitely provided it is not mechanically disturbed.

Some additions to the apparatus for carrying out the method of the present invention have proved to be quite convenient and useful. One of these is the addition of a solvent tank, solvent pump and solvent hose to flush out the mixing chamber with solvent. This adds nothing to the basic method of sanitary land fill described above, but does greatly simplify use of the apparatus by providing a convenient method for flushing out the mixing chamber and other nozzle parts after each use. Water, of course, could not be used because the mixture is insoluble in water.

Another feature that has been found to be very useful in improving the uniformity of the layer of foam that can be laid down by a workman using the above described apparatus is air atomization, which may be provided by an air compressor connected to the nozzle by an air hose. Valves in the solvent hose and air hose may be provided for controlling the flow of solvent and air respectively.

While the invention has deen described in detail in the foregoing description, the same is to be considered as illustrative and not restrictive in character, it being understood that only the preferred embodiment has been described and that all changes and modifications that come within the spirit of the invention and the scope of the claims are also desired to be protected.

The invention claimed is:
1. A method for making a sanitary land fill comprising the steps of:
   filling a land area with successive layers of refuse; and
   covering each of said layers or refuse with an overlayer of a foamed plastic material which solidifies to a rigid cell structure.
2. The method according to claim 1 wherein said foamed plastic material is applied to said layers of refuse as a partially foamed material and which expands in situ and solidifies to said rigid cell structure.
3. The method according to claim 1 wherein said foamed plastic material is applied to said layers of refuse through a nozzle having a mixing chamber, said foamed plastic material is partially formed in said mixing chamber as the product of a chemical reaction between a plastic resin and a blowing agent.
4. The method according to claim 3 wherein said plastic resin is a polyurethane.

References Cited

UNITED STATES PATENTS

| 2,015,361 | 9/1935 | Holland | 61—35 |
| 3,367,892 | 2/1968 | Jorczak et al. | 61—36 X |
| 3,379,253 | 4/1968 | Chism | 166—33 |

JACOB SHAPIRO, Primary Examiner

U.S. Cl. X.R.

61—1